Feb. 2, 1926. 1,571,684
J. F. O'CONNOR
FRICTION SHOCK ABSORBING MECHANISM
Filed Jan. 8, 1923  2 Sheets-Sheet 2

Witnesses
Wm. Geiger

Inventor
John F. O'Connor
By George I. Haight
His Atty.

Patented Feb. 2, 1926.

1,571,684

UNITED STATES PATENT OFFICE.

JOHN F. O'CONNOR, OF CHICAGO, ILLINOIS, ASSIGNOR, BY MESNE ASSIGNMENTS, TO W. H. MINER, INC., A CORPORATION OF DELAWARE.

FRICTION SHOCK-ABSORBING MECHANISM.

Application filed January 8, 1923. Serial No. 611,236.

*To all whom it may concern:*

Be it known that I, JOHN F. O'CONNOR, a citizen of the United States, residing at Chicago, in the county of Cook and State of Illinois, have invented certain new and useful Improvements in Friction Shock-Absorbing Mechanisms, of which the following is a full, clear, concise, and exact description, reference being had to the accompanying drawings, forming a part of this specification.

This invention relates to improvements in friction shock absorbing mechanisms.

In certain types of friction shock absorbing mechanisms, and more particularly friction draft riggings employing a cylindrical friction shell having interior curved friction surfaces, it is desirable to have the friction surfaces converged inwardly of the shell in order that a true surface contact may be maintained between the shell friction surfaces and the corresponding curved friction surfaces of the friction shoes at all points during the compression stroke. The friction shells are ordinarily made as casting without machining, in order to retain the cost of manufacture within reasonable limits. It is extremely difficult to so core a cylindrical friction shell as to provide accurate curved friction surfaces tapering inwardly of the shell in the proper manner, without the necessity of a machining operation.

An object of my invention is to provide a friction shell with a liner so arranged that the operative inner friction surfaces of the shell may readily be made converging and more particularly such a liner as provides converging friction surfaces that are curved in cross-section.

Another object of the invention is to provide a friction shell with a liner such that it is held in place by parts of the mechanism proper and may be readily renewed or replaced when desired.

Figure 1:
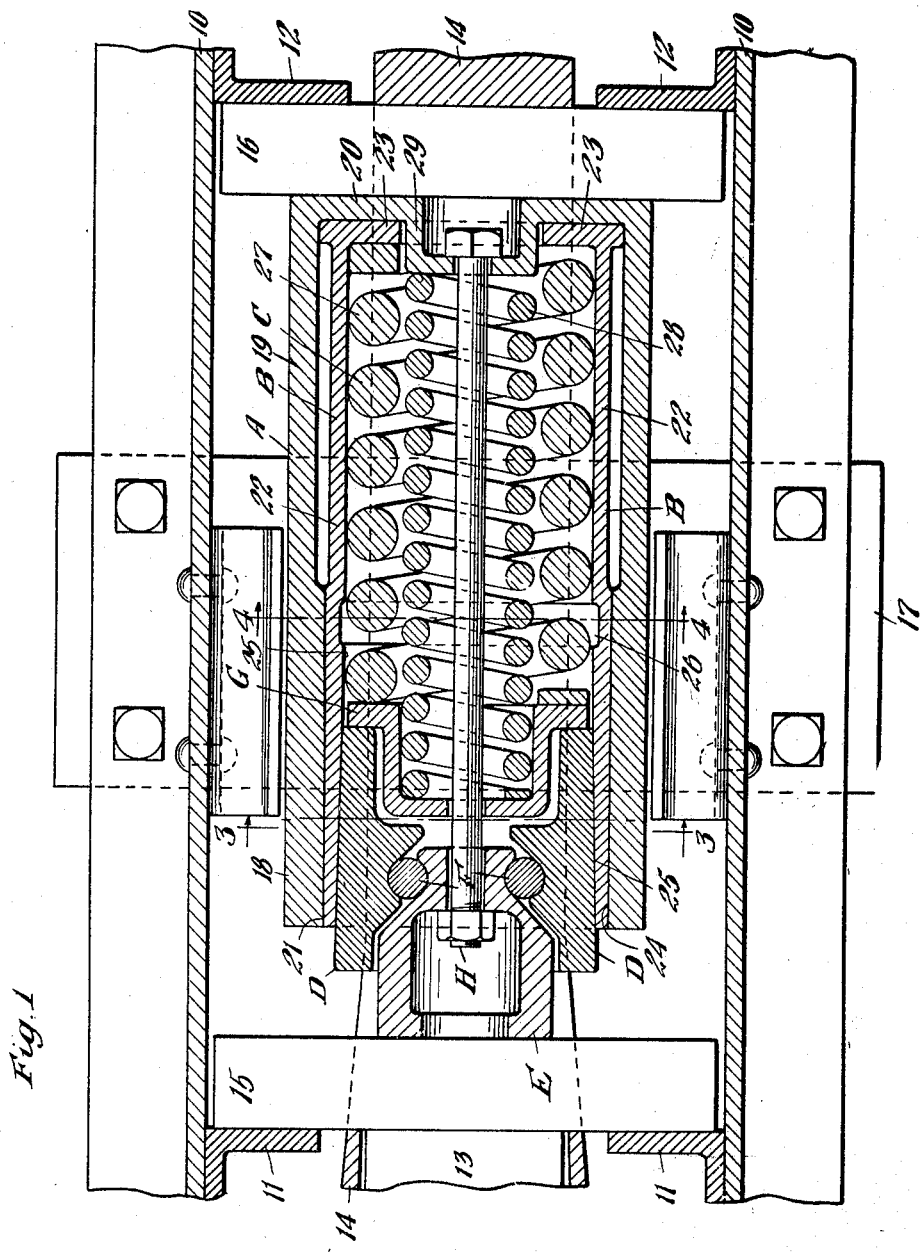
Figure 2:
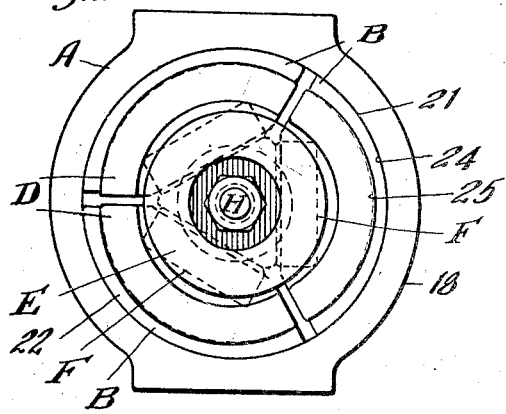
Figure 5:
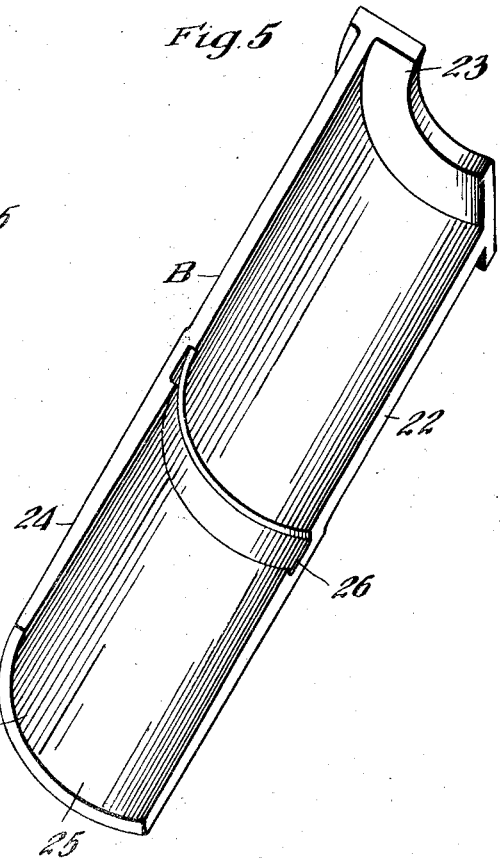
Figure 3:
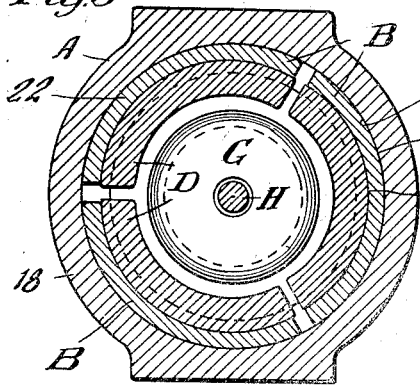
Figure 4:
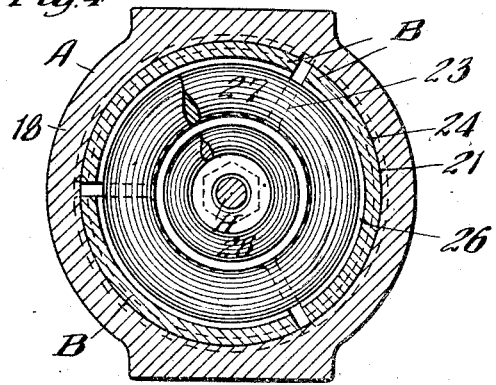

In the drawings forming a part of this specification, Figure 1 is a longitudinal sectional view of a portion of a railway draft rigging showing my improvements in connection therewith, the section through the shock absorbing mechanism proper corresponding to two intersecting planes at 120° apart. Figure 2 is a front end elevation of the shock absorbing mechanism proper. Figures 3 and 4 are vertical transverse sectional views of the shock absorbing mechanism proper taken on the lines 3—3 and 4—4 respectively of Figure 1. And Figure 5 is a detail perspective of one of the sections of the liner.

In said drawings, 10—10 denote the usual channel draft sills of a car underframe, to the inner faces of which are secured front stop lugs 11 and rear stop lugs 12. A portion of a draw bar is indicated at 13, the same being operatively associated with the shock absorbing mechanism proper by a hooded cast yoke 14, within which is disposed the shock absorbing mechanism proper, a front follower 15, and a rear follower 16. The yoke and parts therewithin are supported in operative position by a detachable saddle plate 17.

The improved shock absorbing mechanism proper comprises, broadly, an outer casing in the form of a casting designated A; an interior liner comprised of three similar sections B—B; a spring resistance C; a plurality of wedge-friction-shoes D; a wedge proper E; anti-friction rollers F between the wedge and shoes; a spring cap G; and a retainer bolt H.

The casting A, as shown, is of substantially cylindrical form throughout and is open at its forward end wherein the friction shell proper is provided, this portion of the casting being thickened as indicated at 18. Rearwardly of the thickened section 18, the casting A has a cylindrical section 19 which may be considered as part of the spring cage and at its rear end has an integral transverse wall 20, bearing on the follower 16. The interior of the casting A, at its open end, is made cylindrical, as indicated at 21.

The liner, as shown, consists of three sections B—B, each extending through an arc of approximately 120°. All the sections B are of similar form and each comprises an elongated web 22 with a transversely extending flange 23 at its inner end. The web 22, at its outer or front end, is formed on the exterior with a true cylindrical surface 24 extending parallel to the axis of the mechanism and arranged to fit snugly against the face 21. The length of each liner section B is made such that the front end thereof will lie flush with the front end of the casting A when the inner end flange 23 bears against the back wall 20 of the casting, as shown in Figure 1. On the inner side of the web 22, each section B is provided with a friction surface 25 corresponding to a portion of a true cylindrical surface, but which is extended at an acute angle with respect to the axis of the mechanism so that, when the three liner sections B are assembled within the casting A, there will be three cylindrical friction surfaces 25 converging inwardly of the shell. Each friction surface 25 is made of the desired length corresponding to the permissible stroke of the mechanism and at the inner end of each surface 25, the liner section is provided with an arcuate recess 26 so as to prevent accumulation of metal at the inner end of the friction surfaces which might otherwise occur due to the attrition or scoring of the cooperating parts.

The arrangement of friction-shoes D, wedge E and rollers F is of well-known form and need not be described in detail. The spring C, which preferably consists of an outer heavy coil 27 and an inner coil 28 is confined within the liner, the inner end of the heavy coil 27 bearing upon the inturned flanges 23 of the liner sections. The inner coil 28 bears upon a hollow boss 29 integral with the rear wall of the casing A. The front ends of the two coils of the spring bear upon the cup-shaped spring cap or follower G, the laterally extended flange of which, in turn, bears upon the inner ends of the shoes D.

The retainer bolt H is anchored at its inner end within the hollow boss 29 and at its front end within a suitable recess provided in the wedge E.

With the arrangement shown, it will be observed that the sections of the liner will always be retained in their proper place, due to the outer heavy coil 27 of the spring resistance. It will further be noted that the liner which I have provided may be readily removed from the casing A and new parts substituted whenever desired. Furthermore, by employing a liner of the character indicated, I avoid the necessity of coring the liners and am thereby enabled to make the friction surfaces 25 of the desired taper without the necessity of a machining operation. The operation of the device will be understood by those skilled in the art without a detailed description.

I have herein shown and described what I now consider the preferred manner of carrying out the invention, but the same is merely illustrative and I contemplate all changes and modifications that come within the scope of the claims appended hereto.

I claim:

1. In a friction shock absorbing mechanism, the combination with a hollow outer casing open at one end and provided with a wall at the opposite end; of a liner within said casing consisting of a plurality of sections, each section having an inner friction surface at the open end of the casing and a portion thereof extended inwardly and rearwardly of the casing to and bearing upon said wall thereof and abutment means on each of said sections; a friction system within the casing co-operating with the friction surfaces of the liners; a retainer bolt anchoring said friction system to said casing; and a main spring resistance interposed between said friction system and said abutment means of said sections.

2. In a friction shock absorbing mechanism, the combination with a hollow outer casing having a cylindrical interior and open at one end and provided with a wall at the other end; of a liner for said casing consisting of a plurality of sections, each section having an outer face fitting a portion of the interior cylindrical face of the casing and an inner longitudinally extending friction surface, each section being extended inwardly of the casing and having abutment means thereon bearing upon said wall of the casing; a friction wedge system co-operating with said liner; a main spring resistance interposed between said friction wedge system and the abutment means of said liner sections; and a retainer bolt for limiting the outward movement of said friction wedge system with reference to the casing and preventing outward movement of said liner sections.

3. In a friction shock absorbing mechanism, the combination with a friction shell comprising a hollow outer casing open at one end and provided with a wall at the other end and a liner within said casing, said liner consisting of a plurality of sections, each section having an outer face bearing on the interior face of the casing and an inner longitudinally extending friction surface inclined at an acute angle with respect to the axis of the shell, each section having bearing means at the inner end thereof co-operating with the end wall of said casing; friction shoes co-operating with said liner; a main wedge co-operating with said shoes; a spring resistance interposed between said shoes and the bearing means of said liner sections; and a retainer bolt anchored to said casing and main wedge.

4. In a friction shock absorbing mechanism, the combination with a friction shell comprising a hollow outer casing open at one end and provided with a wall at the outer end, the interior of said casing at the open end being of cylindrical form, and a liner for said casing consisting of a plurality of sections, each section having an outer cylindric face fitting a portion of the cylindric interior of the casing and an inner longitudinally extending true cylindrical friction surface, said inner friction surface being inclined at an acute angle to the axis of the shell, and said sections having abutment means thereon; of a friction wedge system co-operating with said liner; a spring resistance having its opposite ends bearing on said friction wedge and the abutment means of said liner sections; and means for limiting the outward movement of said friction wedge system with reference to the casing.

5. A friction shock absorbing mechanism comprising: an outer casing open at one end and provided with an integral transverse wall at the other end, the interior of the open end of said casing being of cylindrical form; of a liner for said casing comprising a plurality of sections, each section, at its outer end, having an outer cylindric surface fitting a portion of the cylindrical interior of the casing and an inner friction surface corresponding to a portion of a cylindrical surface, said friction surfaces converging inwardly of the casing, said liner sections extending to and bearing upon said wall of the casing and provided with inturned flanges at said ends; friction elements cooperable with said friction surfaces; spreading means co-operating with said elements, a spring interposed between said friction elements and said inturned flanges at the inner ends of the liner sections; and means for limiting the outward movement of said spreading means.

In witness that I claim the foregoing I have hereunto subscribed my name this 6th day of January 1923.

JOHN F. O'CONNOR.